United States Patent [19]

Bowman et al.

[11] Patent Number: 5,178,226
[45] Date of Patent: Jan. 12, 1993

[54] LOAD MEASURING SYSTEM FOR REFUSE TRUCKS

[76] Inventors: Allan Bowman, R.R. #1, Newmarket, Ontario, Canada, L3Y 4V8; Ken Giffen, 42 Lorraine Drive, North York, Ontario, Canada; Ron Statler, 601-77 Finch Avenue East, Willowdale, Ontario, Canada, M2N 6H8

[21] Appl. No.: 637,914

[22] Filed: Jan. 7, 1991

[51] Int. Cl.⁵ .................. G01G 19/08; G01G 19/40; B65G 69/00
[52] U.S. Cl. ..................... 177/139; 177/141; 177/25.14; 414/21
[58] Field of Search ............ 177/25.14, 139, 141, 177/147

[56] References Cited

U.S. PATENT DOCUMENTS

| | | |
|---|---|---|
| 2,757,923 | 8/1956 | Lefsheik . |
| 2,851,171 | 9/1958 | Martin et al. . |
| 3,063,576 | 11/1962 | Hofmeister . |
| 3,290,931 | 12/1966 | Fowkes et al. . |
| 3,321,035 | 5/1967 | Tarpley . |
| 3,612,490 | 10/1971 | Bopp et al. . |
| 3,659,665 | 5/1972 | Godwin et al. . |
| 3,827,514 | 8/1974 | Bradley . |
| 3,857,452 | 12/1974 | Hartman . |
| 3,910,364 | 10/1975 | Baker . |
| 4,095,660 | 1/1978 | Johansson . |
| 4,281,729 | 8/1981 | Farley et al. . |
| 4,393,951 | 7/1981 | Horst-Rudolf . |
| 4,420,053 | 12/1983 | Russo . |
| 4,645,018 | 2/1987 | Garbade et al. ............ 177/139 X |
| 4,714,122 | 12/1987 | Appleton et al. ............ 177/139 |
| 4,771,837 | 9/1988 | Appleton et al. ............ 177/139 |
| 4,824,315 | 4/1989 | Naub ............ 177/141 |
| 4,854,406 | 1/1989 | Appleton et al. ............ 177/139 |
| 5,004,392 | 4/1991 | Naab ............ 177/139 X |
| 5,038,876 | 8/1991 | Smith ............ 177/139 |

FOREIGN PATENT DOCUMENTS

| | | |
|---|---|---|
| 906515 | 8/1972 | Canada . |
| 1014984 | 8/1977 | Canada . |
| 1044713 | 12/1978 | Canada . |
| 1166656 | 5/1984 | Canada . |
| 3332058 | 3/1985 | Fed. Rep. of Germany . |

Primary Examiner—George H. Miller, Jr.

[57] ABSTRACT

A load weighing system for refuse trucks preferably of the type using a front end loader which lifts, empties and lowers containers. Measurements are made of variable angles of pivoting elements and forces within hydraulic cylinders causing the pivoting elements to pivot. Other measurements are made of geometric constants in the apparatus. Sensors monitor the measured variables and the output is provided to a computational unit. The computational unit has been pre-programmed with the measured geometric constants and combines the variables with the constants to calculate a distance to the center of gravity of a container being emptied. Once the distance is calcuated, the measured force within the hydraulic cyinder can be used to calculate a weight. The weight of the container being lowered as calculated is then subtracted from the weight of the container raised as calculated. The resultant weight is the weight of the refuse emptied from the container.

15 Claims, 8 Drawing Sheets

LOAD MEASURING SYSTEM FOR REFUSE TRUCKS

FIELD OF THE INVENTION

This invention relates generally to the field of load-weighing systems and the components for such load weighing systems for refuse or garbage trucks. In particular, this invention relates to the load-weighing systems and devices that may be used to determine the weight of refuse emptied from a container into a refuse truck.

BACKGROUND OF THE INVENTION

Garbage is a major environmental problem, especially now for urban centers. Typically garbage is collected from various premises and taken to a disposal site. Often such disposal sites are landfill sites, where the garbage is essentially dumped into a hole in the ground. However, the disposal of such garbage is a major environmental concern. Landfill disposal sites are expensive to operate and tend to fill up over time, thus needing to be replaced. Rising land costs have made replacement of landfill sites expensive. Additionally, landfill sites may be environmentally hazardous, with chemicals, pollutants and the like leaching into the ground water supply.

Faced with the rising costs and concerns about landfill sites, the operators of such landfill sites have begun to dramatically increase the fee charged for disposing garbage at such sites. Typically now the fee charged is based on the weight of garbage disposed of. Thus, each refuse truck seeking to off-load garbage is weighed on the way into the landfill site and weighed on the way out of the landfill site. The weight difference is then calculated and a fee is paid in accordance with that weight difference.

Additionally, concerns have been raised about the total weight of individual vehicles which travel public roads. The greater the weight of the vehicle the greater the wear of the roadway. Weight restrictions have been imposed on many roadways and substantial fines may be payable for overweight vehicles. Also, the land fill site records can be used as evidence of overweight violations by the appropriate regulatory agency. Both of these trends, namely increased costs of dumping and increased overweight fines, increase the importance for refuse truck operators being able to know the total weight of the refuse being carried in their trucks, and the incremental weight being added by each additional pickup.

In a typical refuse operation, a customer signs a contract which guarantees that a refuse receptacle will be emptied on a periodic basis. However, the contract is typically based upon a flat fee and does not take into account the actual weight of refuse to be removed from the site. The weight of the refuse may vary with demolished building materials being very heavy whereas cardboard packing or paper packing products are very bulky, but light. The refuse hauler pays to dump the refuse at the landfill or other disposal site based upon the weight of refuse being disposed. However, the customer is charged on a flat fee for a given time, such as a week or month, resulting in customers with light refuse being overcharged, while customers with heavy refuse are undercharged. What is desired therefore, is a way for the refuse operator and the refuse-hauling companies to determine the weight of refuse being hauled from each customer's container each time. Preferably, such measurement device would enable the operator of the refuse vehicle to know also what the weight of the refuse of the truck at any given time was to avoid overloading the truck and thus being liable for over-weight fines.

There are several examples of past devices which attempt to provide the desired weight information. However, these prior devices all suffer from various unsuitabilities. For example, there are devices which require that the lifting, emptying and return cycle for emptying a container into the refuse truck be interrupted so that a weight reading can be made. The stopping of the lifting and lowering motion of the container is unsuitable for several reasons. Firstly, there is a time loss associated with such a stoppage which is unacceptable. Secondly, the machinery used to effect the lifting is often quite powerful, but not very nimble. Thus, requiring the cycle to be stopped typically causes large vibrations, which may create excessive wear on the equipment and premature breakdown. Thus, devices which require the operation to be stopped in order to effect measurement are not suitable. Examples of such devices may be found in U.S. Pat. No. 4,645,081 to Garbade and German Publication 33 32 058.

Other devices have been proposed which involve vertical load cells upon which the container being weighed is placed. However, these also have a number of disadvantages. As indicated previously, the equipment while powerful often vibrates upon beginning or ending its motion. Thus, placing containers directly on vertical load cells is unsuitable, because it is difficult to protect the load cells from excessive wear by the rough use that such equipment typically gets. An example of such a device is again U.S. Pat. No. 4,645,081 and U.S. Pat. No. 4,714,122.

Other systems have proposed for example measuring the fluid pressure of the hydraulic cylinders, which are used to effect the lifting of the refuse containers. Examples of such systems include U.S. Pat. Nos. 4,771,837; 4,824,315; and 4,854,406. However, in each of these devices the pressure sensed is remote from the actual loading causing the pressure. Thus, other factors affect the pressure reading. Such factors include the amount of acceleration on any upward or downward swing and more importantly, the length of the moment arm between the centre of gravity of the weight being lifted and the pressure being sensed. The centre of gravity of any given refuse container may vary considerably depending upon how the refuse is placed in the container. Often, the container is loaded from one end, resulting in the centre of gravity of the refuse being closer to that end. In addition, the position of the container on the lifting forks may vary a certain amount. Thus, without knowing where the centre of gravity of the refuse-filled container is, it is impossible to accurately estimate the weight of the container simply by measuring the hydraulic cylinder pressure. Errors in estimating the weight of the container based on a measurement of pressure remote from the container may be in the order of 20–40%, if the centre of gravity is not at the assumed centre of volume, because of the moment arm involved. Further, the pressure reading in the hydraulic cylinder may not be an accurate representation of the lifting force. For example, viscosity effects which are temperature-dependent, and stiction which may be considered as the frictional resistance force within a hydraulic cylinder vary with temperature and pressure respectively. Thus, any system which attempts to accurately estimate weight should consider these effects also.

What is desired therefore, is a method of accurately determining the weight of a container being lifted, emptied and lowered without requiring the use of vertical load cells or the actual stopping of the lifting and lowering cycle, and which will determine the weight of the material dumped from the container into the refuse truck.

SUMMARY OF THE PRESENT INVENTION

According the present invention there is provided an apparatus for determining the weight of material emptied from a container said apparatus comprising:
 at least one fixed component;
 at least one pivoting component pivotally attached to said fixed component at one end, and being releasably connectable to said container at the other end;
 at least one first pivoter acting between said fixed component and said pivoting component to cause said pivoting component to pivot about said pivotal attachment to said fixed component;
 at least one angle sensor mounted so as to provide output corresponding to the degree of rotation of said pivoting member relative to a horizontal plane;
 at least one second sensor mounted so as to provide output corresponding to the force exerted within said pivoter;
 a source of electrical power; and
 a programmed computational unit,
 said computational unit receiving said outputs from said sensors and combining said outputs with a plurality of predetermined and pre-input constants to calculate a distance to a center of gravity of the container being lifted emptied and lowered by said apparatus, said computational unit further combining said calculated distance with said measured force within the pivoter to calculate the weight of the container being lifted and lowered, said lowered weight being then subtracted from said lifted weight to determine the weight of the material emptied from said container.

BRIEF DESCRIPTION OF THE DRAWINGS

Reference will now be made, by way of example only, to preferred embodiments of the invention with reference to the following drawings in which.

DETAILED DESCRIPTION OF THE INVENTION

Figure 1:
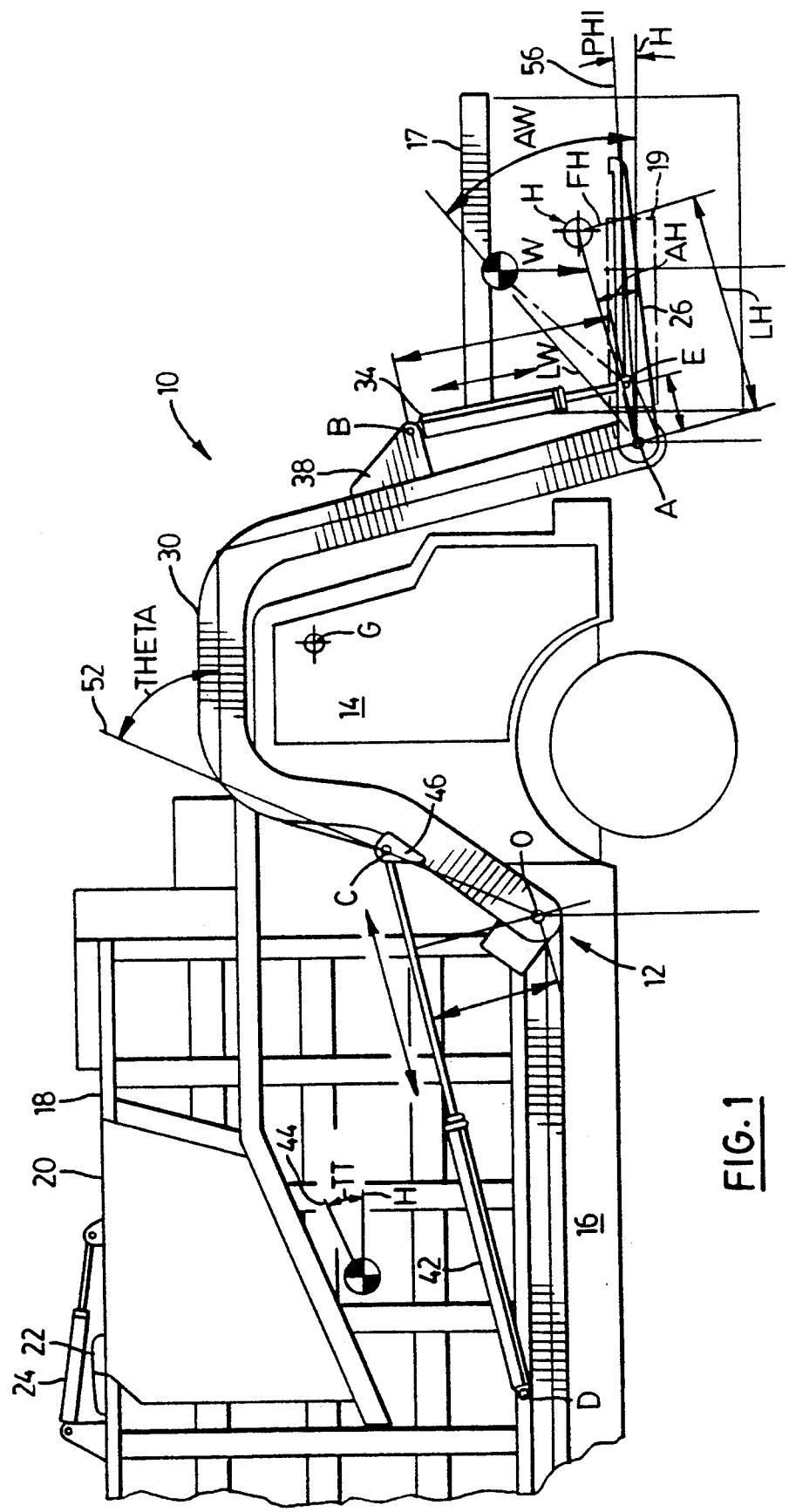
FIG. 1 is a side view of a front end loading refuse truck having a weighing system according to the present invention.

FIG. 1 shows a typical front end loading refuse truck indicated generally with reference no. 10 having a load-weighing system or apparatus indicated generally as 12 according to the present invention. The truck 10 has a cab 14 and a truck body 16. The truck body 16 carries a receptacle 18 into which refuse containers 17 may be emptied as described below. The receptacle 18 is provided with a cover 20 which is attached by hinges 22. A cover hydraulic piston 24 acts between the cover 20 and the receptacle 18 to raise and lower the cover around the hinges 22. The cover hydraulic cylinder 24 may be operable from the cab or may be automatically operated upon operation of the front end loading system, in a known manner, as described below.

The load-weighing system 12 is preferably comprised of a number of interacting elements as described herein. The system 12 may be divided into three main categories, namely, the lifting components, which comprise the lift arms and hydraulic cylinders as described below; the data, which comprises constants and measured variables as described below, and a computational unit to translate the data into useful information which comprises circuitry, and a method of calculation embodied in computational algorithm, again, as described below.

Lifting Components

Beginning at the front end FIG. 1 shows a fork arm 26 which is pivotally attached to a generally n-shaped lift arm 30 at pivot point A. In turn, the lift arm 30 is pivotally attached to the main body 16 at a trunnion pivot 0. Acting between the fork arm 26 and the lift arm 30 is a fork hydraulic cylinder 34 which acts as a pivoter to cause fork arm 26 to pivot relative to lift arm 30. The fork hydraulic cylinder 34 is pivotally attached to the fork arm 26 at a pivot E and to a pivot point B on a gusset plate 38, which is in turn attached to the lift arm 30. The fork arm 26 is releasably connected to the refuse container 17, usually by being insertable into a lifting slot 19 shown in ghost outline in FIG. 1.

Acting between the lift arm 30 and the truck body 16 is a main lift hydraulic cylinder 42 which also acts as a pivoter to cause lift arm 30 to pivot relative to truck body 16. The main lift hydraulic cylinder 42 is pivotally attached to the truck body 16 at a pivot point D at one end and is pivotally attached to a gusset plate 46 at a pivot point C at the other end. Each of the hydraulic cylinders is similar in operation as described in more detail below. Also shown is G which is the center of gravity of the arm 30 and fork 26 mechanisms, and which is explained in greater detail below also shown is point R, which is the center of gravity of the refuse indicated by the vector W.

Data: Measured Variables

Also shown in FIG. 1 are some of the variables which are measured and utilized as inputs in the instant invention. According to one embodiment of the instant invention three angles are measured. These angles are indicated as TT, Theta and Phi respectively on FIG. 1. TT is the truck tilt angle, which is the angle along the longitudinal axis 44 of the truck body 16 with respect to a horizontal plane H. The angle Theta is considered as the main fork angle and in FIG. 1 is shown as the angle between a horizontal axis also shown as H and the actual inclination of the horizontal portion of the lift arm 30 shown as 52. The third angle Phi, is measured between a horizontal axis again shown as H and the axis of the front fork 26 indicated as 56. It will be appreciated that in FIG. 1 the axes 44, 52 do not actually represent the axes of the truck body 16 or main lift arm 30 as shown, but merely indicate the angle being measured. More specifically, the axis 52 is an imaginary axis, and the main arm 30 is shown in solid outline at an arbitrary angle of Theta equals zero for illustration purposes. The angles are preferably measured with inclinometers which provide outputs to corresponding to the degree of rotation of the arms 26, 30 and truck body 16 relative to a horizontal plane.

As will be appreciated by those skilled in the art, it is not essential to have a truck tilt sensor, since most times the truck will operate on essentially level ground. However, when operating over a curb, or on a slope the truck tilt angle is needed to provide accurate results.

In addition to measuring angles, readings are taken of the variable forces in the hydraulic cylinders 34 and 42. Measurements are preferably made of the front fork arm 26 lift and return pressures, as well as the main lift arm 30 lift and return pressures. In this sense, the fork lift pressure refers to pressure readings taken on the sides of the fork cylinders 34 which are filled when the fork cylinders 34 are contracting. The fork return pressure refers to pressure readings taken on the sides of the fork cylinders 34 which are filled when the fork cylinders 34 are extending. Similarly, the arm lift pressure refers to a pressure reading taken on the side of the main lift hydraulic cylinders 42 that are filled when the cylinders 42 are contracting. The arm return pressure refers to readings taken on the side of the main lift hydraulic cylinders 42 that are filled when the cylinders 42 are extending. Such measurements are preferably made with pressure transducers, which provide an analog output signal that in turn is measured to determine the sensor reading.

Figure 2:
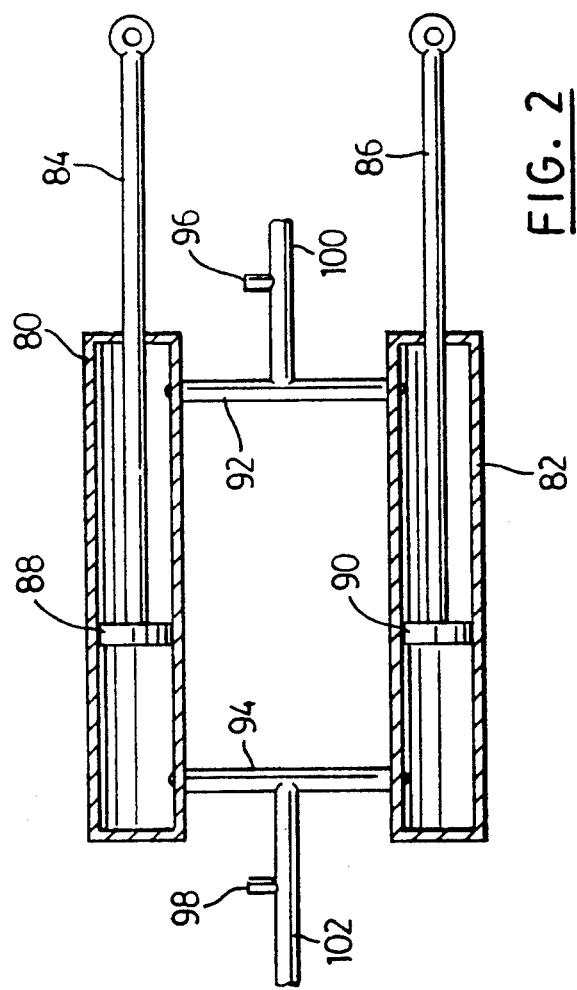
FIG. 2 is a schematic view of the hydraulic components of the weighing system of FIG. 1.

FIG. 2 shows a schematic of how the pressure measurements are taken from the hydraulic cylinders. FIG. 2 shows hydraulic cylinders 80, 82 which can be either the main lift cylinders 42 or the fork cylinders 34. It will be appreciated that in FIG. 1 only one of each is shown whereas the actual typical truck has one of each cylinder on each side of the truck. The cylinders 80, 82 have cylinder rods 84, 86 respectively with cylinder heads 88, 90. A hydraulic line 92 is connected on one side of the cylinder heads 88, 90 and a hydraulic line 94 is connected on the other side. Pressure reading ports are identified as 96 and 98 in lines 100 and 102. Lines 100 and 102 lead back to a hydraulic reservoir and a pump in a known manner. By operation of the pump, hydraulic fluid can be pumped into the cylinders to push against the cylinder heads to cause the cylinders to move. By taking pressure readings at ports 96 and 98, and determining the area of the cylinder head upon which the pressures act, forces on either side of the cylinder head can be calculated. By subtracting the forces, the actual force felt in the cylinder rod 84 can be determined.

Each of the sensors is preferably connected to a measurement unit, which consists of a multi-channel analog to digital convertor controlled by a microprocessor. It has been found convenient to use an eight channel convertor. The measurement unit is preferably connected to a computation unit which consists of a microprocessor for computing a weight value, based upon the measured variable and constant inputs. This computation is carried out in accordance with an algorithm which is explained in more detail below. In the preferred embodiment, the algorithm is programmed into the computational unit.

Data: Constants

Figure 3:
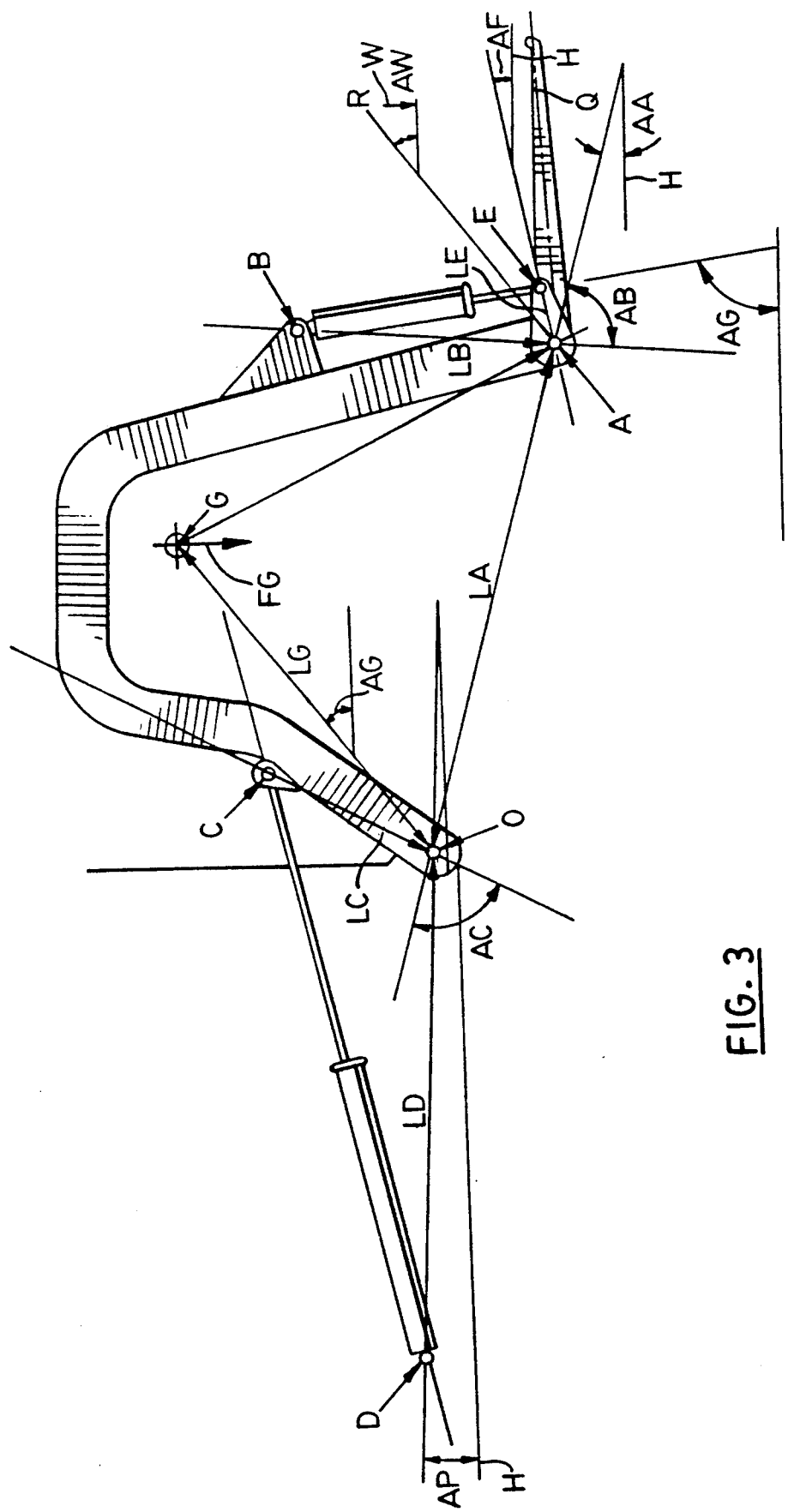
FIG. 3 is a side view of various components of the weighing system of FIG. 1 illustrating various points of reference.

In addition to the measured variable angles and variable pressures as aforesaid, in the preferred embodiment of the instant invention various geometric constants are measured and programmed into the algorithm. More specifically, it has been found convenient to measure the following constants:

A distance LA which is the measured distance between pivot point 0 and pivot point A, as shown in FIG. 3;

A distance LB which is the measured distance between pivot point A and pivot point B as shown in FIG. 3;

A distance LC which is the measured distance between pivot point 0 and pivot point C as shown in FIG. 3;

A distance LD which is the measured distance between pivot point 0 and pivot point D as shown in FIG. 3;

A distance LE which is the measured distance between the pivot point A and the pivot point E as shown in FIG. 3;

A angle AB which is the measured angle between the extensions of lines OA and AB as shown in FIG. 3;

An angle AC which is the measured angle between the lines OA and OC as shown in FIG. 3;

A distance LG is the measured distance between the pivot point O and the center of gravity G of the arm 30 and fork 26 mechanism;

A force FG is the weight of the arm and fork mechanism; and,

An angle O is the angle between line AG and a horizontal plane H as shown in FIG. 3.

Also, for the purpose of the hydraulic cylinder force calculations, it is preferred to measure the areas of the pistons upon which the lift and return pressure in the hydraulic fluid is acting. This, one can measure for example area 1, which is the surface of the hydraulic piston face on main arm cylinder 30 on the lift side, and area 2, which is the same measurement, but on the return side. Also, area 3 can be determined which is the surface area of the piston face of the fork cylinder lift side, and area 4, which is the same measurement on the return side.

FIG. 3 also illustrates three angles which can be determined once the inclinometers to measure TT, Theta and Phi have been appropriately calibrated More specifically, the output from the inclinometers may be manipulated in a manner that will readily be appreciated by those skilled in the art to yield three variable angles: AA between the line OA and horizontal H; AF between line AE and horizontal H; and AP between line DO and horizontal H also shown is an Angle AW which is between a line AR and the horizontal.

Computational Unit: Method of Calculation

It will be appreciated by those skilled in the art that with the foregoing measured variables and constants, it is possible to determine the location of the centre of gravity of a waste filled refuse container 17 which is lifted, emptied and lowered by the refuse truck 10. The solved for centre of gravity is identified as arrow W and is located a distance LW from the pivot A as shown in FIG. 1.

One geometric solution for the center of gravity W of the refuse container 17 follows. Firstly, the force FC, which is the actual force along the main arm lift cylinder 42 axis is equal to the measured variable pressure $P_1$ times area 1 less the measured variable pressure $P_2$ times area 2. Similarly, the force FE, which is the actual force at any given moment along the fork arm lift cylinder 34 is equal to the measured variable pressure $P_3$ times the constant area 3 less measured variable pressure $P_4$ times the constant area 4.

Figure 4A:
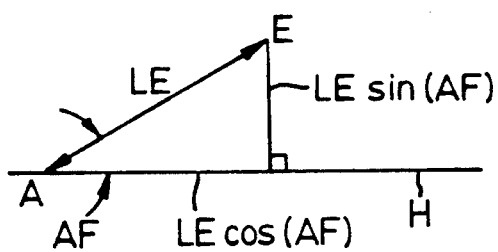
FIG. 4a is a schematic of the geometric analysis of a component LE.
Figure 4B:
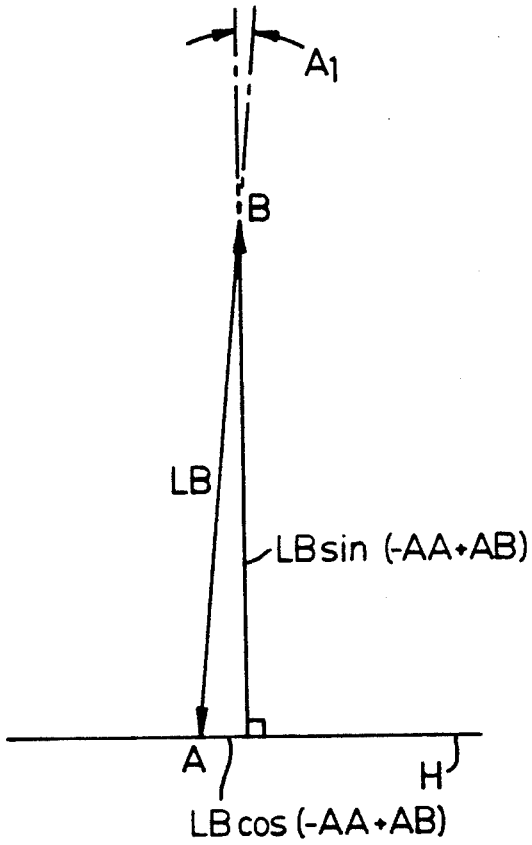
FIG. 4b is a schematic of the geometric analysis of a component LB.

As illustrated in FIG. 4a, the horizontal projection of line AE is equal to LE times cos(AF) and the vertical projection of line AE is equal to LE times sin(AF). As illustrated in FIG. 4b, the horizontal projection of line AB is equal to LB times the sin(AA+AB) where the angle (AA+AB) is defined as the angle between line AB and horizontal.

An angle A1 may now be solved for, which is defined as the angle between the center line of the fork tilt cylinder 34 and vertical. The tangent of A1 is the horizontal projection of line EB divided by the vertical projection as follows:

$$A1 = ATAN(((LE \times \cos(AF)) + (LB \times \cos(AA-AB)))/((LB \times \sin(AA+AB)) - (LE \times \sin(AF))))$$

Figure 4C:
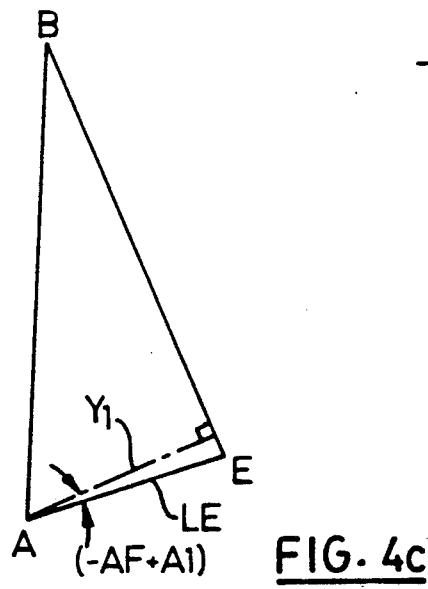
FIG. 4c is a schematic showing a component $Y_1$.

As shown in FIG. 4c, a moment arm for the force FE around pivot point A can also be derived. A distance Y1 is shown as perpendicular from pivot point A onto line EB and is calculated from $Y1 = (LE \times Cos(A6-AF))$. As shown, angle (AF−A1) is the angle between line AE and the perpendicular Y1.

Figure 5A:
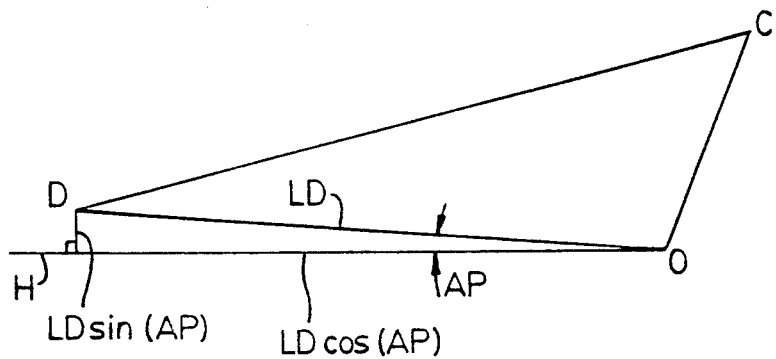
FIG. 5a is a schematic of the geometric analysis of a component LD.
Figure 5B:
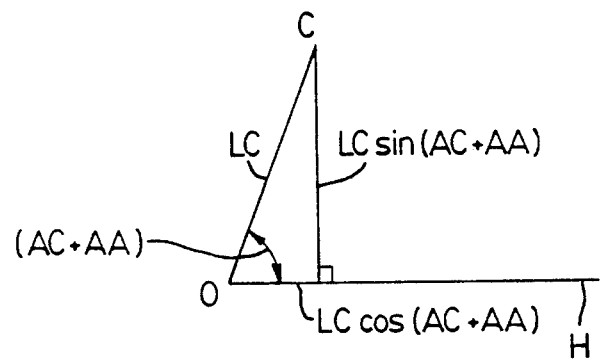
FIG. 5b is a schematic of the geometric analysis of a component LC.

A similar series of calculations can be performed in respect of the main lift arm 30. FIG. 5a shows the vertical projection of line DO, which is LD times sin(AP). The horizontal projection of line DO is shown as LD times cos(AP). FIG. 5b illustrates the vertical projection of line OC, which is LC times Sin (AC+AA). The horizontal projection of line OC is LC times cos(AC+AA). As shown, angle (AC+AA) is the angle between the line OC and horizontal.

An angle A2 may now be derived, which is defined as the angle between the centerline of the main lift cylinder and horizontal. The tangent of A1 is the vertical projection of line DC divided by the horizontal projection as follows:

$$\text{Angle } A2 = A\ TAN(((LC \times \sin(AC+AA)) + (LD \times \sin(AP)))/((LC \times cps(AC+AA)) + LD \times \cos(AP))))$$

Figure 5C:
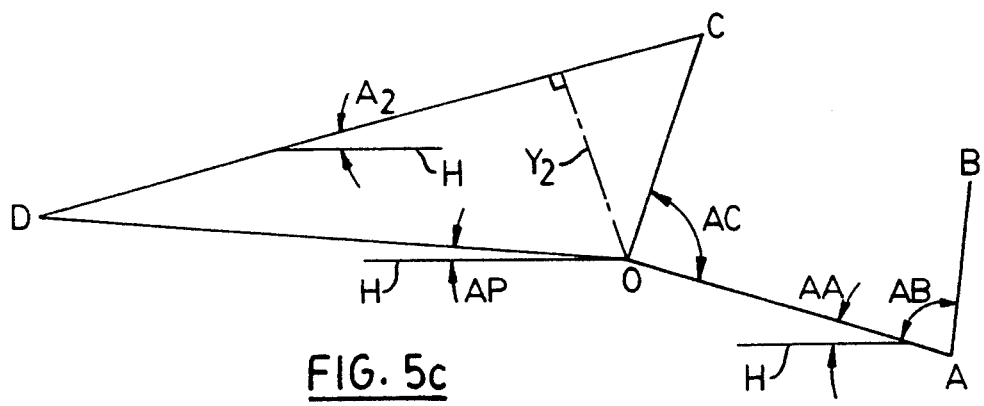
FIG. 5c shows a component $Y_2$.

FIG. 5c shows how the moment arm of force FC around point O is derived, namely, distance Y2 which is the perpendicular from point O onto DC where angle (A2-AF) is the angle between line DO and line DC thus, $Y2 = LD \sin(A2-AP)$.

Now, the moment acting on the main lift arm at point O can be determined, which is $MA = FC \times Y2$.

From the foregoing it will now be appreciated how the instant invention can be calibrated in a preferred manner. Even when the main lift arm 30 and the fork arm 26 are empty, the hydraulic cylinders must do work in lifting up the arms 26 and 30, because of the arms' weight. In the most preferred system according to the present invention, a calibration lift can be performed, with no refuse container, for the of identifying the center of gravity of the empty main lifting arms, which is shown as G in FIG. 1 empty bin and fork arms as H. From such a calibration lift, the force FG, the angle AG and the distance LG can be determined and by lowering an empty bin the force FH, the Angle AH and the distance LH can also be derived.

LW is the actual distance from point A to the center of gravity of the bin and any contents from the fork pivot, and may be derived from the following equation:

$$LW\cos(AW) = \frac{[(FE)(Y1) - (FH)(LH)\cos(AH)]LA\cos(AA)}{(FC)(Y2) - (FE)(Y1) - (FG)(LG)\cos(AG) - (FH)(LA)\cos(AA)}$$

Where FE times Y1 is the moment of the fork arm around pivot point A and $LA \times \cos(AA)$ is the horizontal projection of line OA, as noted before.

It will now be appreciated that the weight can be derived, which is equal to $$W = \frac{(FC)(Y2) - (FE)(Y1) - (FG)(LG)\cos(AG)}{LA\cos(AA)} - FH$$

In other words, the weight WB is equal to the moment acting around pivot point A divided by the horizontal distance to the center of gravity of the waste bin 17.

Computational Unit: On-Board Circuitry

Figure 6:
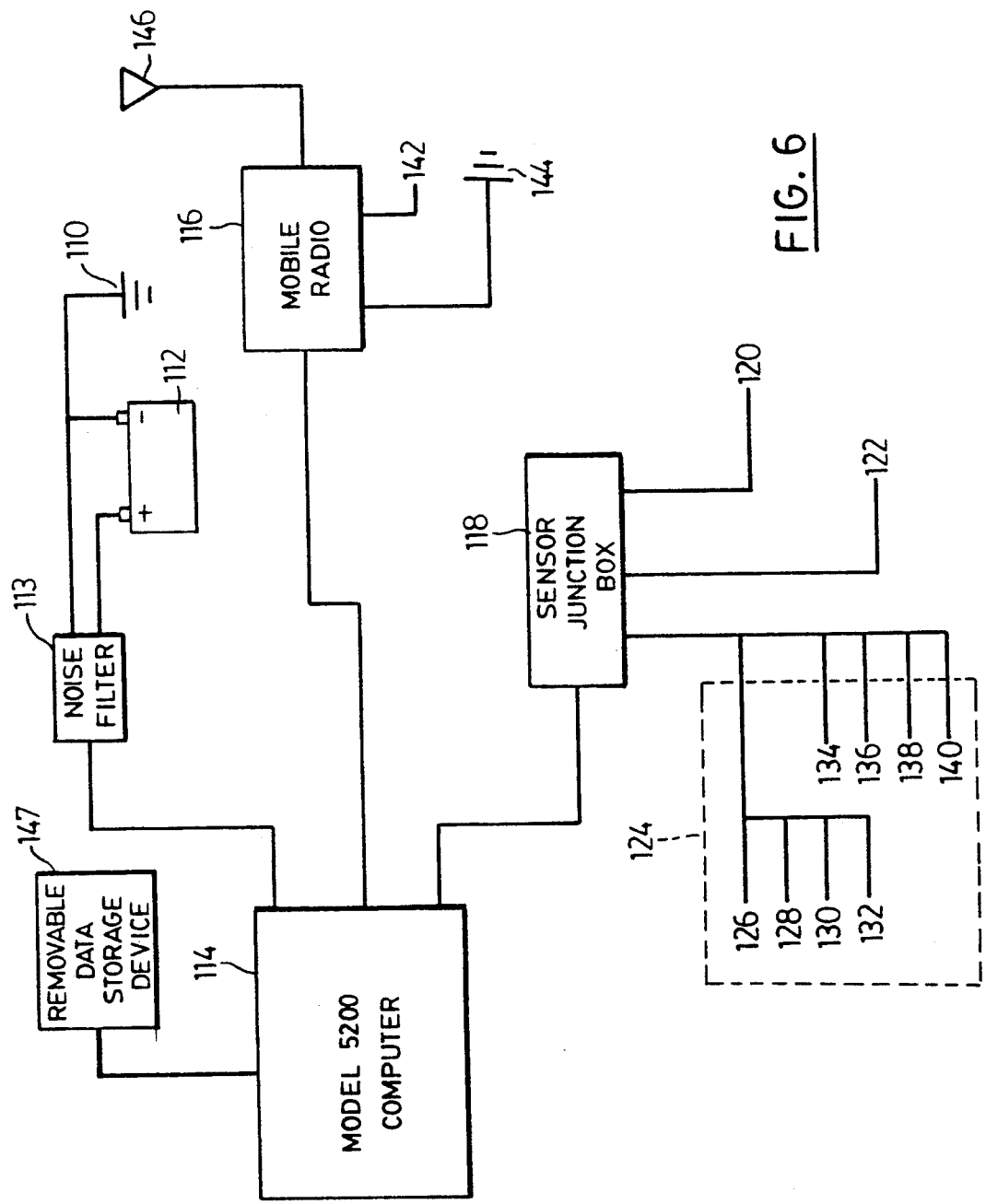
FIG. 6 is an electrical schematic drawing according to the instant invention.

Turning now to FIG. 6, there is shown a schematic diagram of the on-board circuitry according to the present invention. The circuitry will be described with respect to the preferred calculation system described above, although those skilled in the art will appreciate that with modifications in where the readings are taken, it would also be appropriate for other equivalent calculation systems. FIG. 6 shows a ground 110 and a battery 112. Both positive and negatives leads from the battery 112 pass through a noise filter 113 prior to powering a computational unit or computer 114. The computer has several input and output ports which can be utilized to input and/or extract weight, sensor and other information from the truck. One output port leads to a mobile radio 116, another to a removable data storage device 147 and an inport which takes input from a sensor junction box 118. The sensor junction box in turn has a number of inputs as described herein. Input 120 may be for example the vehicle speed, input 122 may be for example the hydraulic pump speed. Dashed lines 124 indicate the measured inputs required for the centre of gravity weight solving system. The inputs 126 and 128 are the pressure readings on the lift and return sides of the main arm hydraulic cylinders. The measured inputs 130 and 132 are the pressure readings taken on the lift and return sides of the fork arm cylinders. The measured input 134 is TT, the truck tilt angle. The measured input 136 is Theta, the measured angle of the main lift arm above the horizontal, and the measured input 138 is the measured value of angle Phi. Measured input 140 is the temperature of the hydraulic fluid. It will be appreciated that the temperature of the hydraulic fluid can be used to make viscosity corrections to the pressure readings of inputs 126, 128, 130 and 132.

In the described system, the battery 112 is preferably the vehicle battery. However, mobile radio 116 is preferably equipped with its own 12 V battery 142 to avoid draining the vehicle battery 112. The mobile radio 116 is therefore provided with its own separate ground 144. The mobile radio 116 is also equipped with an antenna 146. The lines running into the sensor junction box are preferably two-channel lines, and the sensor junction box is preferably attached to the computer 114 with a 28-channel line. The connection with the mobile radio is preferably a 5-channel line.

Computational Unit: Algorithm

Figure 7:
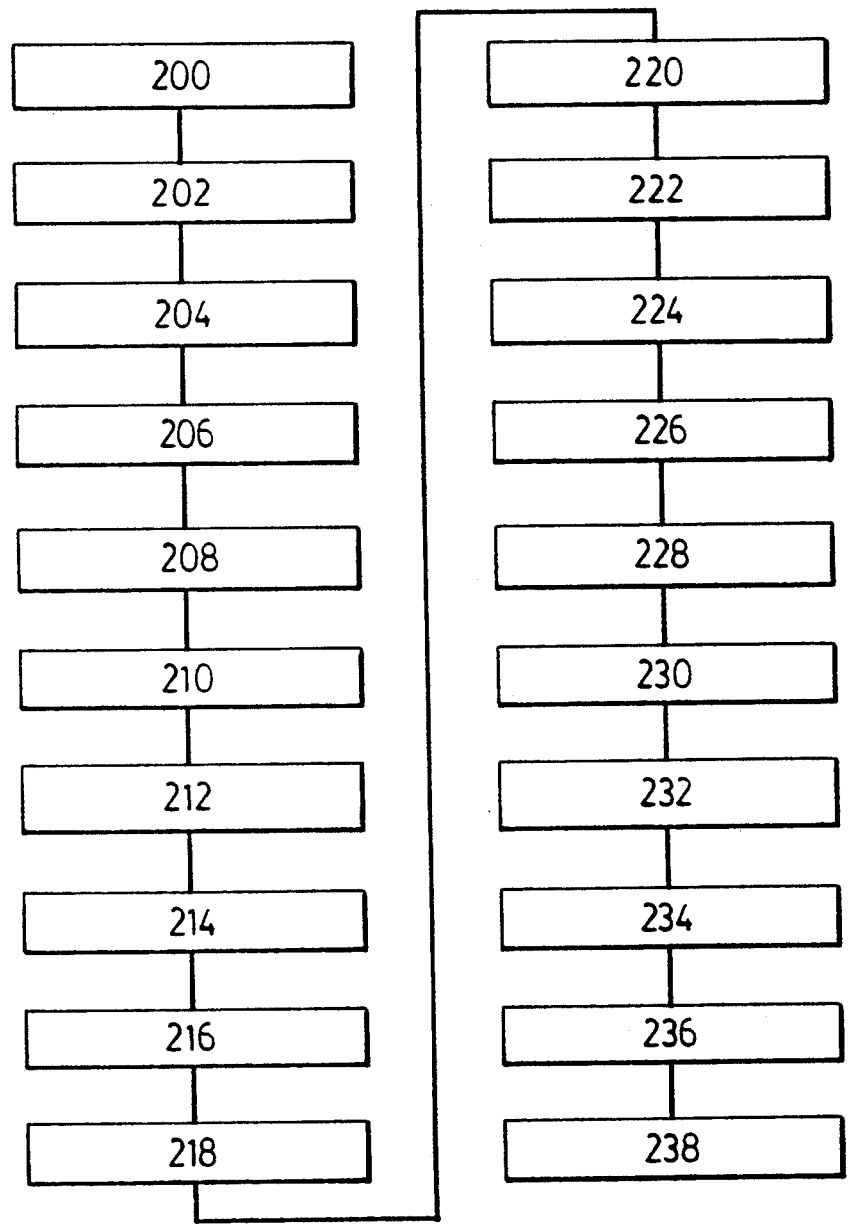
FIG. 7 is a block diagram depicting a preferred algorithm.

The foregoing calculations are preferably used in association with an algorithm to compute the way the refuse contained in the refuse bin. Reference will now be made to FIG. 7, in which the preferred steps of a computational algorithm are identified. The first step indicated as 200 is to collect a set of pressures, namely $P_1$ and $P_2$. The next step, shown as 202 is to compute a set of arm forces FC based on the measured pressures from step 200 together with the constant areas previously input. The next step, shown as 204 is to collect a set of pressures $P_3$ and $P_4$ shown as 204. Then, at 206 a computation is done to determine a set a fork forces FE.

According to another aspect of the instant invention, the steps 200, 202, 204 and 206 can be replaced. More specifically, it would be possible to install load cells directly within the body of the hydraulic cylinders or rods or their mounts which would yield a direct force measurement. This would eliminate the need for computing the lift and return pressures based on the subtracted values of the measured pressure at any given instant in one of the cylinders. Rather, the load cell placed directly in the hydraulic cylinder rod, or in the connection between the hydraulic cylinder, rod and/or the truck body, would provide an output capable of being translated directly into force. This would simplify the calculation somewhat although the algorithm generally would proceed in the same manner, namely, to solve for the center of gravity of the lifted and returned refuse container.

Figure 8:
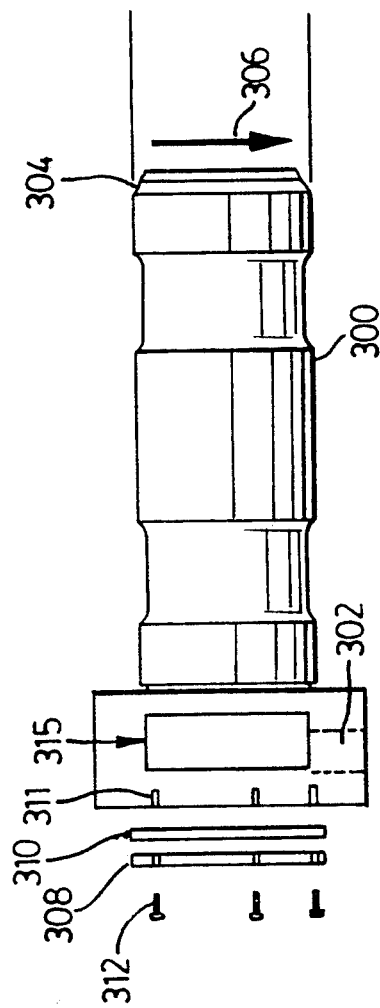
FIG. 8 is a view of an alternate embodiment for an axial load cell.
Figure 8A:
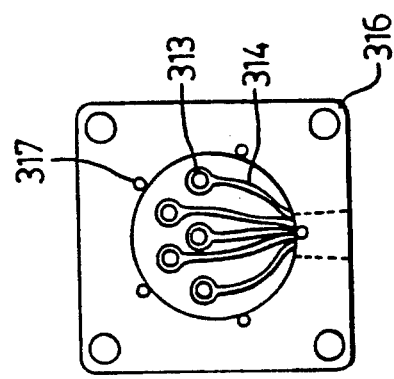
FIG. 8a is an end view of the embodiment of FIG. 8.

An example of the load cell according to this embodiment of the present invention is shown in FIG. 8. A pin 300 is shown which has a head 302 and an end 304. Arrow 306 indicates the direction of the force across the pin 300. The pin 300 is preferably inserted in either point C or D, on both sides (left and right) of the truck, 10, and at either B or E on both sides as well. Thus, the axial load in each cylinder can be measured, and averaged to obtain the overall force. FIG. 8 shows a cover 308 and a gasket 310. A plurality of screws 312 which fit into hole 311 to secure the cover to the pin. FIG. 8a shows a plurality of electrical heads 313 and leads 314, each of which is operatively connected to Wheatstone bridge formed from strain gauges or the like shown schematically as box 315. FIG. 8a is an end view with the cover off of FIG. 8. Also shown are holes 316 for mounting the load cell 300 in place by means of mounting screws (not shown).

The next step is to collect a set of angles, namely, angles AA, AF and AB which is indicated at step 208. The next step, 210, is to compute a set of distances $Y_1$ in accordance with the above equations. Then, at step 212 a computation is made for a set of distances $Y_2$. Step 214 indicates a further computational step, wherein the moments MA acting on the arm pivot are calculated. Then, at step 216 a set of distances LW, the location of the center of gravity of the bin from the fork pivot A is calculated.

Next step 218 is preferably a computational check step. Step 218 measures the calculated distance LW against a table lookup value based upon MA. If any distance LW is out of tolerance, then it is discarded. In practice, the LW value can be off due to an extreme vertical orientation. In the vertical orientation, there is no pressure in the cylinders and the readings become very erratic and meaningless.

The next step 220 is a step which takes the set of distances LW previously calculated and from them computes an average distance LW (AVE). Then, in step 222 a set of weights WB is calculated from the set of calculated moments MA and the average distance LW (AVE).

Then, in step 224 the mean and standard deviation of the set of weights WB so calculated can be determined. It will be appreciated by those skilled in the art that step 226, while not necessary, is preferable. In step 226, any weights outside of a fixed deviation are discarded. This ensures that anomalous data points which otherwise might skew the set of readings are rejected as being anomalous. Step 228 which follows is a calculation of the average weight WB(AVE) derived from the set of weights WB which remain after the discarding step 226.

Step 230 indicates the next step of the algorithm, which is to obtain the weight of the bin and the contents on the lift portion of the cycle which may be characterized as WL. Again, for accuracy of readings, it is preferable to use a calibration curve fit to obtain a true weight LW(curve fit). The curve to which the derived or calculated weight is fit is generated from test data in controlled circumstances to determine the effect on the measurements of the actual weight of the bin being lifted. This calibration correction overcomes the difficulty associated with increased pressure in the hydraulic system affecting its performance such as the degree of stiction of the like. Stiction in this sense may be defined as the force required to cause the cylinder to move which generally increases with the amount of pressure in the hydraulic system. The calibration correction is made according to weight measured and estimated affect that the test results give on actual weight measured and is denoted as step 232.

Step 234 is a calculation step by which the weight of the empty bin on the return cycle is determined. This weight may be denoted as WR.

Step 236 preferably is a parallel calibration step to step 232. Of course, step 236 is conducted in association with the weight of the bin on the return cycle rather than on the lift cycle.

Finally, step 238 is the weight calculation step which calculates the true weight of refuse emptied from the bin by subtracting the weight return curve fit from the weight lifted curve fit.

In summary, the algorithm determines the weight of the bin and its contents on the lift portion of the cycle and the return weight of the bin is determined on the return portion of the cycle. Then, the weight of the contents emptied is determined by subtracting the two derived weights.

As will be appreciated by those skilled in the art, the measured variables can be collected over any reasonable sampling speed. However, it has been found convenient to collect samples at the rate of 10 times per second through a 15 degree arc during the lift or upward cycle of the main lift arm 30. While the range of angles for making the measurements can vary, a convenient range is of angle AA between 15° and 30°. On the return cycle it has been found preferable to take measurements of the variables through a 20° arc beginning at angle AA=40° and proceeding until angle AA=20°. As will be appreciated because the measurement cycle is time based, the speed of the arm travel will determine the number of readings taken.

The preferred sampling arc is determined on the basis of smooth operation of the hydraulic system on the way up and on the way down. Smooth operation in this sense can be defined as the range of travel of the hydraulic system in which no other factors are causing an incorrect result. For example, in many conventional trucks, the receptacle cover 20 will begin to be lifted automatically once the mainlift arm 30 has reached a certain amount of lift. This extra lifting causes added pressure within the hydraulic system which throws off the measured readings. Therefore, it is preferred to choose a range of the lift and lower cycle which is generally unaffected by other hydraulic operations. It will be appreciated by those skilled in the art that the selection of a preferred range is only one technique by which the instant invention may be effected. Another method would be to automatically calibrate each calculation based on measured values against calibration data taken to determine the effect of any such other influences on the hydraulic system.

It can now be appreciated how the instant invention operates. Upon lifting, the computer will be programmed to begin recording readings for a given angle of either the fork arm inclinometer or the lift arm inclinometer. Then, continuous stream of readings will be recorded, until the lift arm reaches a particular inclination. The calculations will be performed to provide a range of weights, and then the average weight can be used as the measured value. Thus, the average weight on the raise cycle will be the weight of the container plus the refuse. Similarly, the average weight on the return cycle will be the average weight of the empty container. Subtracting the calibrated average weight of the raised container from the calibrated average weight of the lowered container will yield the weight of garbage placed in the receptacle.

It will be appreciated by those skilled in the art that various modifications to the instant invention can be made, which still fall within the scope of the claims. Some of these variations have been suggested above, and others will be apparent to those skilled in the art. For example, while it is possible to make calculations based on the measurement of some of the distances and some angles, it is also possible to measure other distances and angles to arrive at the exact location of the centre of weight. However, the important aspect of the instant invention is the solution to the exact location of the centre of weight being lifted, whereby the accuracy of the weight measurement is greatly enhanced.

We claim:

1. An apparatus for determining the weight of material emptied from a container said apparatus comprising:
   at least one pivoting component pivotally attached to said fixed component at one end, and being releasably connectable to said container at the other end;
   at least one first pivoter acting between said fixed component and said pivoting component to cause said pivoting component to pivot about said pivotal attachment to said fixed component;
   at least one angle sensor mounted so as to provide output corresponding to the degree of rotation of said pivoting member relative to a horizontal plane;
   at least one second sensor mounted so as to provide output corresponding to the force exerted when said apparatus is supporting said container;
   a source of electrical power; and
   a programmed computational unit, said computational unit receiving said outputs from said sensors and combining said outputs with a plurality of predetermined and pre-input constants to calculate a distance to a center of gravity of the container being lifted emptied and lowered by said apparatus, said computational unit further combining said calculated distance with said measured force within the pivoter to calculate the weight of the container being lifted and lowered, said lowered weight being then subtracted from said lifted weight to determine the weight of the material emptied from said container.

2. An apparatus as claimed in claim 1 further having first and second pivoting components, each with at least one respective first and second pivoter, at least first and second angle sensors mounted so as to provide output corresponding to the degree of rotation of each of said pivoting members relative to a horizontal plane and at least two second sensors mounted so as to provide output corresponding to force exerted within said first and second pivoters.

3. An apparatus is installed on a front end loading refuse truce as claimed in claim 2 wherein said fixed component is a truck body, and a third angle sensor is mounted thereon, said first pivoting components is a main lift arm, said second pivoting component is a fork lift arm and said first and second pivoters are a main hydraulic cylinder and a fork hydraulic cylinder respectively.

4. An apparatus as claimed in claim 1 or 2 wherein said apparatus is calibrated by conducting a lifting and lowering cycle without any container to determine the location of a center of gravity G of the pivoting components, and said center of gravity G is incorporated into said computational unit to enhance the accuracy of said calculated distance to said center of gravity of said container.

5. An apparatus as claimed in claim 1 or 2 wherein said output are provided to said computational unit at a frequency of 10 times per second, and said computational unit calculates an average distance to said container center of gravity based on said output.

6. An apparatus as claimed in claim 5 wherein said outputs are used to calculate a set of weights, and said computational unit determines the mean and standard deviation of said set of weights, rejects those weights outside of a fixed deviation and recalculates to determine an average weight measured.

7. An apparatus as claimed in claim 6 wherein said computational unit has recorded in memory a plurality of calibration curves, said curves being obtained by controlled lifting and lowering of known weights, and said average weight measured is calibrated by fitting said average weight measured onto said calibration curve.

8. An apparatus as claimed in claim 1, 2 or 3 wherein said pivoter is hydraulically actuated, and said output from said angle sensors is discarded by said computational unit except over predetermined lift and lower ranges, said ranges corresponding to generally smooth operation of the hydraulic system.

9. An apparatus as claimed in claim 1, 2 or 3 wherein said computational unit compares said distance calculated to the center of gravity of the container to a tabulated value of such distance stored in memory in said computational unit, and any values out of tolerance with said tabulated values are discarded.

10. An apparatus as claimed in claim 1, 2 or 3 further including a measurement unit comprising a multi-channel analog to digital converter.

11. An apparatus as claimed in claims 1, 2 or 3 wherein said pivoter is a hydraulic cylinder and wherein said second sensor comprises a first pressure transducer mounted on a lift side of said cylinder and a second pressure transducer mounted on a return side of said cylinder, and said force is measured by subtracting the measured pressure return side times the area of a head of said cylinder on the return side from the measured pressure lift side times the area of the cylinder head on the lift side.

12. An apparatus as claimed in claim 1, 2 or 3 wherein said second sensors comprise axial load cells which provide an output which corresponds to the axial force in said pivoter.

13. An apparatus as claimed in claim 1, 2 or 3 wherein said second sensor comprises an axial load cell in the form of a pin upon which said pivoters are pivotally mounted.

14. An apparatus as claimed in claim 2 or 3 wherein an angle AA is defined as an angle between a horizontal plane and a line connecting the pivot point of the first pivoting component to the pivot point of the second pivoting component, and said output from said angle sensors is disregarded by said computational unit except over a predetermined lifting range of $15° \leq AA \leq 30°$ and a predetermined lowering range of $40° \geq AA \geq 20°$.

15. An apparatus as claimed in claim 3 further comprising a pair of main hydraulic cylinders, a pair of fork hydraulic cylinders, and said second sensors each comprise a pair of pressure transducers mounted on the lift and return sides of said cylinders.

* * * * *